(12) United States Patent
Saari (10) Patent No.: US 12,403,339 B2
(45) Date of Patent: Sep. 2, 2025

(54) METHOD AND AQUEOUS COMPOSITION FOR PREVENTING WILDFIRE

(71) Applicant: Xpyro Oy, Oulu (FI)

(72) Inventor: Kimmo Saari, Oulu (FI)

(73) Assignee: Xpyro Oy, Oulu (FI)

( * ) Notice: Subject to any disclaimer, the term of this patent is extended or adjusted under 35 U.S.C. 154(b) by 711 days.

(21) Appl. No.: 17/297,555

(22) PCT Filed: Nov. 15, 2019

(86) PCT No.: PCT/FI2019/050822
§ 371 (c)(1),
(2) Date: May 27, 2021

(87) PCT Pub. No.: WO2020/109654
PCT Pub. Date: Jun. 4, 2020

(65) Prior Publication Data
US 2022/0040512 A1  Feb. 10, 2022

(30) Foreign Application Priority Data

Nov. 30, 2018 (FI) ..................................... 20186023

(51) Int. Cl.
| | |
|---|---|
| *A62C 3/02* | (2006.01) |
| *A62C 27/00* | (2006.01) |
| *A62D 1/00* | (2006.01) |
| *B60C 29/06* | (2006.01) |
| *C08L 1/02* | (2006.01) |

(52) U.S. Cl.
CPC ............ *A62C 3/0242* (2013.01); *A62C 27/00* (2013.01); *A62D 1/005* (2013.01); *A62D 1/0064* (2013.01); *B60C 29/062* (2013.01); *C08L 1/02* (2013.01); *C08L 2201/02* (2013.01); *C08L 2201/54* (2013.01)

(58) Field of Classification Search
None
See application file for complete search history.

(56) References Cited

U.S. PATENT DOCUMENTS

| | | | |
|---|---|---|---|
| 4,665,993 A | | 5/1987 | Balassa |
| 5,964,983 A | * | 10/1999 | Dinand .................. C09K 8/206 |
| | | | 426/573 |
| 2005/0001197 A1 | * | 1/2005 | Clark ..................... A62D 1/005 |
| | | | 252/3 |
| 2012/0090192 A1 | * | 4/2012 | Oevreboe ................ F26B 5/06 |
| | | | 34/285 |
| 2012/0199781 A1 | * | 8/2012 | Rueda-N Nez ........ A62D 1/005 |
| | | | 252/2 |
| 2018/0229471 A1 | | 8/2018 | Zhu et al. |
| 2019/0330531 A1 | * | 10/2019 | Wiehn ................... C09K 21/02 |

FOREIGN PATENT DOCUMENTS

| | | | |
|---|---|---|---|
| CN | 103012849 A | * | 4/2013 |
| CN | 107129599 | | 9/2017 |
| CN | 107497088 | | 12/2017 |
| DE | 2537000 | | 3/1977 |
| FI | 130214 B | | 4/2023 |
| IN | 106807002 | | 6/2017 |
| JP | 2016176055 | | 10/2016 |
| KR | 20090025979 | | 3/2009 |
| WO | 9322000 | | 11/1993 |
| WO | 9943391 | | 9/1999 |
| WO | WO-2018122406 A1 | * | 7/2018 ............. C09K 21/02 |

OTHER PUBLICATIONS

English Translation of WO 93/22000 (Year: 1993).*
Office action of priority Finnish application FI20186023, dated Dec. 21, 2021; 4 pages.
Communication of acceptance of priority Finnish applicaiton FI20186023, dated Dec. 9, 2022; 3 pages.
International Search Report and Written Opinion mailed Feb. 21, 2020 in PCT/FI2019/050822 (12 pages).
International Preliminary Report on patentability mailed Feb. 11, 2021 in PCT/FI2019/050822 (7 pages).

* cited by examiner

*Primary Examiner* — Tanisha Diggs
(74) *Attorney, Agent, or Firm* — Meunier Carlin & Curfman LLC (57) ABSTRACT

The present application provides a method for preventing wildfire in a target, the method comprising providing an aqueous composition comprising fire retardant and fibrillar cellulose and applying the aqueous composition to the target. The present application also provides an aqueous composition comprising fire retardant and fibrillar cellulose, and a container comprising the aqueous composition. The present application also provides use of the aqueous composition for preventing wildfire.

19 Claims, 7 Drawing Sheets

| Specimen no | | 1 | 2 | 3 | 4 | 5 | AVG |
|---|---|---|---|---|---|---|---|
| Start time | | | | | | | |
| End time | | | | | | | |
| Sample | | Untreated Forest chipping | Treated forest chipping | Treated peat | Treated peat | Untreated peat | |
| Time to ignition | s | 6.6875 | 40.0625 | 815.25 | 835.5 | 6.375 | 340.775 |
| Duration of test | s | 777 | 988 | 1207 | 1039 | 1289 | 1060 |
| Mass remaining after test | g | -0.5 | 1.92 | 35.92 | 29.73 | 14.37 | 16.288 |
| Total mass loss (g) | g | 10.53 | 8.11 | 29.77 | 41.48 | 42.67 | 26.512 |
| Mass loss per square meter | g/m² | 1130 | 870 | 3300 | 4600 | 4730 | 2926 |
| Mass loss rate per square meter | g/m²s | 1.5 | 0.9 | 8.4 | 22.7 | 3.7 | 7.44 |
| Total heat released | MJ/m² | 0 | 0.5 | 26.4 | 23.7 | 75.1 | 25.14 |
| Maximum heat release rate | kW/m² | 230.7 | 95.3 | 63 | 51 | 137.5 | 115.5 |
| Av. heat release rate 60 s after ignition | kW/m² | 190.6 | 68 | 55.6 | 44.3 | 101.1 | 91.92 |
| Av. heat release rate 180 s after ignition | kW/m² | 91.2 | 37.2 | 41.2 | 46.4 | 77.6 | 58.72 |
| Av. heat release rate 300 s after ignition | kW/m² | 63.7 | 24 | 35 | not available | 69.3 | 48 |
| Total heat released 300 s after ignition | MJ/m² | 0 | 0 | 53 | 4 | 93 | 5.4171330 |
| Max heat release rate, 30s sliding average | kW/m² | 0.032127865 | 0.453741878 | 26.177442 | 23.7491874 | 20.51070595 | 24.393625 |
| Effective net heat of combustion | MJ/kg | 17.95 | 9.8 | 55 | 7 | 71.55562592 | 14 |
| Total smoke production | m² | 0.898732 | 0.3599844 | 7.98 | 5.17 | 15.88 | 11.356 |
| Average smoke production | m²/s | 0.001145273 | 0.000871311 | 0.9553193 | 0.4135556 | 0.01271556 | 0.6489495 |
| Average specific smoke production | m²/kg | 84.4 | 106.04 | 0.0007921 | 0.00039841 | 9.87241E-05 | 0.0006611 |
| Total CO-production | g | 0.14116 | 0.26 | 39 | 6 | 2.98 | 47.096 |
| Total CO₂ produced per mass unit burnt | g/g | 3.3849 | 2.70619 | 0.03021 | 0.01171 | 0.01053 | 0.090742 |
| | | | | 0.13536 | 0.06302 | 1.10607 | 1.479108 |

METHOD AND AQUEOUS COMPOSITION FOR PREVENTING WILDFIRE

CROSS-REFERENCE TO RELATED APPLICATIONS

This application is a national stage application filed under 35 U.S.C. § 371 of PCT application serial number PCT/FI2019/050822 filed Nov. 15, 2019, which claims the benefit of priority to Finnish patent application serial number 20186023, filed Nov. 30, 2018, which are hereby incorporated herein by reference in their entireties.

FIELD OF THE APPLICATION

The present application relates to a method for preventing wildfire, to aqueous compositions useful in the method and to use of said aqueous compositions.

BACKGROUND

A wildfire or wildland fire is a fire in an area of combustible vegetation that occurs usually in the countryside or rural area. Depending on the type of vegetation where it occurs, a wildfire can also be classified more specifically as a brush fire, bush fire, desert fire, forest fire, grass fire, hill fire, peat fire, vegetation fire, and veld fire. There may be several natural causes of wildfire ignition, such as dry climate, lightning and volcanic eruption. Further, there are human causes such as arson, discarded cigarettes, power-line arcs and sparks from equipment.

Wildfire tends to spread, and the spread may vary based on the flammable material present, its vertical arrangement and moisture content, and weather conditions. Fire types may be characterized by their fuels, such as ground fires, crawling or surface fires, ladder fires and crown, canopy or aerial fires. Some fire types are especially challenging, for example ground, turf or peat fires wherein the fire may smolder deep under the ground, even at several meters below the ground and at an area of tens of square meters. Currently it may be necessary to dig the ground by using machinery to expose such hidden fires so they can be extinguished. In forest fires there are also other challenging fire targets, such as ant heaps, pitchy stumps and the like, especially when located at rocky terrain, which may also carry after-flames and may need treatments by machinery. This is very slow and expensive as the fire areas may be far away from the nearest roads.

Therefore it would be advantageous to prevent the spreading of such wildfires. However it is challenging to stop or prevent the spreading of fire in the nature, and there is a need for environmental, effective and versatile solutions for controlling wildfire.

SUMMARY

It was found out that the aqueous compositions disclosed herein are very efficient for preventing, suppressing and/or extinguishing fire, especially wildfire and the like. The aqueous composition acts as a fire retardant, and it can be used to slow or stop the spread of fire or reduce its intensity. Also after-flames can be prevented. Different kinds of targets can be treated with the aqueous compositions, which targets will be therefore made less prone to ignite and combust. Such targets include outside and/or nature areas, such as countryside or rural area, for example areas of terrain, ground, turf, peat, forest, brush, bush, desert, grass, hill, vegetation, veld and the like.

The present application provides a method for preventing wildfire at a target, the method comprising
  providing an aqueous composition comprising fire retardant and fibrillar cellulose, and
  applying the aqueous composition to the target.

The present application also provides a method for preventing wildfire at a target, the method comprising
  providing an aqueous composition comprising ammonium phosphate, and
  applying the aqueous composition to the target.

The present application also provides a method for preventing wildfire at a target, the method comprising
  providing an aqueous composition comprising magnesium compound, and
  applying the aqueous composition to the target.

The present application also provides an aqueous composition comprising fire retardant and fibrillar cellulose. The present application also provides an aqueous composition comprising ammonium phosphate and fibrillar cellulose. The present application also provides an aqueous composition comprising magnesium compound and fibrillar cellulose.

The present application also provides use of the aqueous composition for preventing wildfire.

The present application also provides a container or a vehicle tyre containing the aqueous composition.

The main embodiments are characterized in the independent claims. Various embodiments are disclosed in the dependent claims. The embodiments and examples recited in dependent claims and in the description are mutually freely combinable unless otherwise explicitly stated.

Preventing fire, as discussed herein, includes all actions aiming or leading to preventing, suppressing or extinguishing fire or ignition, or spreading of fire. For example it is possible to create protective areas, such as protective zones, to ground or other area or especially to areas of high risk, and for example to surround an existing fire at least partly by creating protective areas around the fire to prevent the fire from spreading. Especially the compositions disclosed herein may be used to treat areas or targets in preventive manner, which may be classified as passive fire extinguishing. Active fire extinguishing refers to action directed to an existing fire. It is also possible to apply the composition directly into an existing fire as a fire extinguishing agent, which is useful especially in emergencies. Especially in the case of a turf or peat fire or the like which smolders under the ground, the compositions may be used to effectively extinguish such fire, and/or to isolate the fire. This cannot be necessarily done by using water, as water cannot always properly penetrate dry ground or peat.

The method disclosed herein is efficient for preventing different kinds of wildfires, such as ground fires, turf fires, peat fires, crawling or surface fires, ladder fires and crown, canopy or aerial fires. The targets, such as ground and/or surface, may be treated with the aqueous compositions in such extent that ignition and/or spread of the fire can be prevented or suppressed. For example in ground fires, wherein the fires are fed by subterranean roots, duff and other burned organic matter, and wherein the fire can burn slowly by smoldering for days to months, it is important that the ground is properly and deeply impregnated with the protective composition. It was found out that the present aqueous composition was able to penetrate very deeply into the ground. Further, especially when fibrillar cellulose is included, the composition also stays at the desired target, for example on vegetation and/or at a certain level of the ground, turf, peat or the like, and does not simply flow through it. The composition however does not block the vegetation or ground, and loose plant material does not cake, so the treatment does not interfere living plants.

In crawling or surface fires, which are fueled by low-lying vegetation on the forest floor, such as leaf and timber litter, debris, grass and low-lying shrubbery, and which often burn at relatively low temperature and spread at low rate, the vegetation can be treated efficiently with the aqueous composition. The aqueous composition, unlike water, efficiently penetrates ground and vegetation, even dry ground, turf or peat, and binds to the treated material so that the protective properties remain in the target and protect it from wildfire. The composition is stable and maintains it properties for a long period of time.

The composition forms a protective coating to the treated matter, which efficiently prevents ignition. The composition may also release water of crystallization by heat which cools the fire and helps preventing the spread of the fire.

The aqueous compositions used in the method are inexpensive, which is important because treating large outside areas requires very large amounts of the composition. Ammonium phosphate or magnesium compounds used as the basis of the composition were found to be efficient but very cheap materials, which suited well for the uses discussed herein. The composition is also nontoxic and environmentally safe and it does not contain for example boron, which is not desired in compositions which are used for treating ground or vegetation, and/or silicates. No protective equipment is required in the treatment. As the composition is fully aqueous, the equipment is easy to dean after use. The composition does not loose its properties even if it would freeze, which helps storing and transporting the composition. Also excess release of undesired gases, such as carbon dioxide or toxic gases, is avoided by using the aqueous composition. Further, a composition comprising ammonium phosphate acts as a fertilizer in the ground.

The safe and nontoxic composition, even though it stays in the target for prolonged time, will be eventually washed away by rain and it does not accumulate onto plants and/or in the ground where it could interfere the living plants. No chemicals contained in the composition are therefore bound to the plants for long time. This may be also facilitated by using water-soluble compounds.

DETAILED DESCRIPTION

In this specification, percentage values, unless specifically indicated otherwise, are based on weight (w/w). If any numerical ranges are provided, the ranges include also the upper and lower values. The concentrations are presented as dry weight, unless indicated otherwise. The percentages of the ingredients in the final products sum up to 100%. The final product may contain minor amounts of additives customary in the art, such as less than 5% (w/w), less than 3% (w/w), less than 2% (w/w) or less than 1% (w/w).

In the methods for preventing and/or suppressing fire, especially wildfire, as disclosed herein specific aqueous compositions are used for treating the target which is to be protected from fire. The composition is water-based and contains no or only a minimal amount of harmful substances, which are not desired in environment or equipment. The composition preferably has a substantially neutral pH.

The present disclosure provides a method for preventing wildfire at a target, the method comprising
providing an aqueous composition comprising fire retardant, and
applying the aqueous composition to the target. The present disclosure also provides a method for treating target, especially for preventing wildfire, with the aqueous composition(s) disclosed herein. The target may include any target or material disclosed herein, Therefore the present disclosure also provides a method for treating material(s) with the aqueous composition(s) disclosed herein.

The aqueous composition may be an aqueous composition disclosed herein. The composition is a water-based composition comprising at least fire retardant, such as ammonium phosphate(s), magnesium compound(s) and/or other fire retardant(s) disclosed herein. The aqueous composition may further comprise fibrillar cellulose, one or more surfactant(s) and/or other agent(s) disclosed herein. The aqueous composition may consist of or substantially consist of the ingredients mentioned herein. The composition may be obtained by combining and/or mixing the ingredients in aqueous solution.

Providing the composition as aqueous enables efficient handling and applying the composition especially in the application disclosed herein relating to preventing wildfire. For example aqueous composition may be sprayed or otherwise applied or spread directly to the target, even from a distance.

The aqueous composition described herein is preferably sprayable composition. It means that the composition contains such an amount of water that it is flowable and/or it is present as and behaves as a water solution or water dispersion. The aqueous composition may contain at least 20% (w/w) of water, such as at least 30% (w/w), at least 40% (w/w) or at least 50% (w/w). This may depend on the ingredients included in the composition, or the general concentration of the composition. The composition may be provided as a ready-to-use solution or dispersion, which contains a higher amount of water, or it may be provided as a concentrate, for example for storage and/or transportation purposes, wherein it contains a lower amount of water. The concentrate may be formable into final composition by adding an amount of water, such as in a ratio of 2:1-10:1 of water:concentrate. The composition may be based on water solution (aqueous solution), wherein one or more compounds, such as one or more of the fire retardant compound(s) and optionally other ingredient(s) are solubilized in water, i.e. provided as a water solution, and fibril cellulose and optionally other ingredient(s) are dispersed to this water solution.

A fire retardant, as used herein, may refer to one or more agent(s) or compound(s), which are used to slow or stop the spread of fire or reduce its intensity, or to prevent ignition or combustion. Usually a fire retardant comprises or is an inorganic agent or compound. Preferably the fire retardant compound(s) is/are water-soluble.

In some embodiments the fire retardant comprises ammonium phosphate. The ammonium phosphate may comprise or be diammonium phosphate, monoammonium phosphate or a combination thereof. In general ammonium phosphate may be prepared by treating phosphoric acid with aqueous ammonia.

Monoammonium phosphate (MAP), also called as ammonium dihydrogen phosphate (ADP), has a formula $NH_6PO_4$ or $NH_4H_2PO_4$. Monoammonium phosphate is soluble in water and crystallizes from it as the anhydrous salt in the tetragonal system, as elongated prisms or needles. Monoammonium phosphate is industrially prepared by the exothermic reaction of phosphoric acid and ammonia in the correct proportions:

$$NH_3 + H_3PO_4 \rightarrow NH_6PO_4$$

Crystalline MAP then precipitates, which may be solubilized in water. Monoammonium phosphate is very inexpensive agent which makes it especially advantageous for outdoor uses because a large amount of the agent is often required.

Diammonium phosphate (DAP), also called as diammonium hydrogen phosphate (IUPAC name), has a formula $(NH_4)_2HPO_4$.

Ammonium phosphate is highly soluble to water. In practice the aqueous composition may comprise ammonium phosphate in the range of 5-55% (w/w), such as in the range of 10-50% (w/w). In most cases solutions containing ammonium phosphate in the range of 20-50% (w/w), such as 20-30% (w/w), for example as an aqueous solution saturated with ammonium phosphate, are practical for the uses disclosed herein.

It was found out that ammonium phosphate alone, or as the main or only fire retardant compound, could provide efficient fire retardant properties for the uses discussed herein, i.e. preventing wildfires. Therefore in one example the aqueous composition may contain ammonium phosphate, such as monoammonium phosphate or ammonium diphosphate, as the only fire retardant in the composition, so that the composition may consist of water and ammonium phosphate. In further embodiments the composition may consist of water, ammonium phosphate and one or more ingredients disclosed herein, such as fibrillar cellulose, phosphoric acid, ammonium sulfate, ammonia, ammonium phosphate, urea, complexing agent, magnesium compound, such as magnesium sulphate, surfactant(s), colouring agent(s) and/or combinations thereof. Additives customary in the art may also be included.

Alternatively, or in addition, the aqueous composition may comprise magnesium compound as fire retardant. Magnesium compound, which may be a magnesium salt such as magnesium sulphate, magnesium hydroxide or hydromagnesite, may be included in the composition. Hydromagnesite may be provided as a combination of huntite and hydromagnesite. Magnesium compound may be included in an amount in the range of 15-60% (w/w), such as 30-60% (w/w), 40-60% (w/w), 15-50% (w/w), 15-40% (w/w), 15-30% (w/w) or 30-50% (w/w). Magnesium compounds may be used for example in cases wherein it is not desired to fertilize the environment, for example in the case of a nature conservation area. In one example the aqueous composition may contain magnesium compound as the only fire retardant in the composition Magnesium sulfate is preferred. Magnesium sulfate is an inorganic salt with the formula $MgSO_4(H_2O)x$ where $0 \leq x \leq 7$. It is highly water-soluble salt, and the solutions of magnesium sulfate are almost neutral. Therefore the use of magnesium sulfate does not significantly change the pH of the target. In most practical applications magnesium sulfate may be used in an amount in the range of 15-50% (w/w), such as 15-40% (w/w) or 15-30% (w/w), for example as an aqueous solution saturated with magnesium sulfate.

It was found out that the adhesion of the aqueous solution or the components thereof to material to be treated could be significantly enhanced by including an amount of fibrillar cellulose to the aqueous composition. This can prevent the aqueous composition flowing completely through for example ground, turf, peat or the like materials, so it is possible to control the distribution of the composition to the target material, especially by selecting the type and amount of the fibrillar cellulose included in the aqueous composition. It may also prevent the composition from impregnating too deep into the ground. Also the aqueous composition containing fibrillar cellulose was effectively adhered to vegetation, such as leaves, grass and other plant parts. Such composition dried fast and was able to more effectively protect for example peat, turf, vegetation, bushes, branches, crowns etc., when compared to composition lacking the fibrillar cellulose. As cellulose is natural material, it is biodegradable. Fibrillar cellulose was found to work and being compatible with the tested compositions, such as compositions containing ammonium phosphate or magnesium sulphate. Therefore the present disclosure also provides a method for enhancing adhesion of fire retardant to the target, or to the material to be treated.

The fibrillar cellulose may be microfibrillar cellulose or nanofibrillar cellulose. In one example the aqueous composition comprises ammonium phosphate and fibrillar cellulose. In one example the aqueous composition consists of water, ammonium phosphate and fibrillar cellulose. In one example the aqueous composition comprises monoammonium phosphate and fibrillar cellulose. In one example the aqueous composition consists of water, monoammonium phosphate and fibrillar cellulose. In some examples also magnesium compound is included. In one example the aqueous composition comprises magnesium compound, such as magnesium sulfate, and fibrillar cellulose. In one example the aqueous composition consists of water, magnesium compound and fibrillar cellulose. In one example the aqueous composition consists of water, magnesium sulfate and fibrillar cellulose. However, in some examples these compositions further contain additives customary in the art, and/or for example one or more colouring agent(s). However in some cases it is not desired to include surfactant to a composition comprising fibrillar cellulose.

The cellulose polymer is a naturally occurring linear polymer comprising repeating units of glucose. Single polymers are stacked together forming fibrils, and these fibrils stack together again to form the cellulose fiber structure that is present in nature. Fibrillar cellulose refers to such cellulosic material wherein the fibrils are exposed, such as fibrillated cellulose. Fibrillar cellulose may have an average diameter of fibrils or fibril bundles of 2 μm or less, or 1 μm or less, such as 500 nm or less, such as 2-2000 nm, 2-1000 nm, 10-1000 nm or 2-500 nm.

The cellulose may be obtained from plants or it may be bacterial cellulose. Fibrillated cellulose, such as microfibrillated cellulose (MFC), may be obtained through a fibrillation process of cellulose fibers. Using mechanical shearing, the cellulose fibers are separated into a three-dimensional network of fibrils or fibril bundles with a large surface area. The obtained fibrils are much smaller in diameter compared to the original fibers and can form a network or a web-like structure. This provides specific properties such as very high water retention capacity and ability to form strong gels at low concentrations due to a larger number of hydroxyl groups. Fibrils may have diameters in nanometers and lengths in micrometers, which makes them long and thin. The fibrillation degree usually correlates with the diameter of the obtained fibrils or fibril bundles. The more fibrillated material, the thinner the fibrils or fibril bundles and therefore more hydroxyl groups are exposed, which enhances the characteristic properties of fibrillar cellulose.

Plant cellulose may be wood-based cellulose or it may be from non-wood material such as agricultural residues, grasses or other plant substances such as straw, leaves, bark, seeds, hulls, flowers, beet, vegetables or fruits from cotton, corn, wheat, oat, rye, barley, rice, flax, hemp, manila hemp, sisal hemp, jute, ramie, kenaf, bagasse, bamboo or reed. Fibrillar cellulose derived from wood is usually obtained from secondary cell walls, i.e. it is non-parenchymal. It has different properties than fibrillar cellulose from non-wood plants, which contains fibrils originated from primary cell walls. In general, in the cellulose from primary cell walls, i.e. parenchymal cellulose, such as from beets and the like, the microfibrils are easier to liberate from the fibre matrix than fibrils from wood, and the disintegration requires less energy, which is advantageous for the present use as the material is inexpensive. These materials are still somewhat heterogeneous and may comprise or consist of large fibril bundles. In some examples the fibrillar cellulose is fibrillated parenchymal cellulose or non-wood cellulose obtained from soybean hulls, pea hulls, corn hulls, bagasse, corn, vegetables, rice, sugar beet, potato pulp, fruits, or mixtures thereof.

Microfibrillar cellulose may have an average diameter of fibrils or fibril bundles of 2 μm or less or 1 μm or less, such as 500 nm or less, such as 100-1000 nm, 200-1000 nm, 250-1000 nm or 200-500 nm. The average length of the fibrils or fibril bundles usually exceeds 1 μm, and it may be 100 μm, 200 μm, 300 μm or even 500 μm.

Nanofibrillar cellulose (NFC) has an average diameter of fibrils or fibril bundles of 200 nm or less, such as 100 nm or less or even 50 nm or less for highly fibrillated material, such as 2-200 nm, 2-100 nm or 2-50 nm. The average diameter of the smallest fibrils, elementary fibrils, is in the range of 2-12 nm. If the elementary fibrils are not completely separated from each other, the entangled fibrils may have an average total length for example in the range of 1-100 μm, 1-50 μm, or 1-20 μm. However, if the nanofibrillar material is highly fibrillated, the elementary fibrils may be completely or almost completely separated and the average fibril length is shorter, such as in the range of 1-10 μm or 1-5 μm.

In an aqueous environment, a dispersion of cellulose fibrils forms a viscoelastic hydrogel network. The gel is formed already at relatively low concentrations of for example 0.05-0.2% (w/w). The viscoelasticity of the hydrogel may be characterized for example with dynamic oscillatory rheological measurements. Usually the fibrillar cellulose is shear-thinning or pseudoplastic material, which means that its viscosity depends on the speed (or force) by which the material is deformed. When measuring the viscosity in a rotational rheometer, the shear-thinning behavior is seen as a decrease in viscosity with increasing shear rate. The hydrogels show plastic behavior, which means that a certain shear stress (force) is required before the material starts to flow readily. Rheological properties of the hydrogel can be used to describe the suspending power of the materials. For example by using viscosity, such as Brookfield viscosity, or turbidity it is possible to characterize the type of fibrillar cellulose, for example the fibrillation degree.

In one example the apparent viscosity of the fibrillar cellulose is measured with a Brookfield viscometer (Brookfield viscosity) or another corresponding apparatus, such as Brookfield DV3T viscosimeter (Brookfield Engineering Laboratories, Middleboro, USA) equipped with a vane geometry (V-72, diameter 21.67 mm, length 43.38 mm), The product is diluted with water to a concentration of 1.0% (w/w), and the sample is agitated for 10 min before the measurement followed by degassing in vacuum to remove the entrapped air bubbles in the sample. The temperature is adjusted to 20° C.±1° C. prior to measurements. The viscosity of the samples is measured at 50 and/or 100 rpm shear rates.

Turbidity of dilute aqueous dispersions of the fibrillar cellulose can be measured with HACH P2100 turbidimeter. The product is diluted with water to a concentration of 0.1% (w/w), and the sample is agitated for 10 min before the measurement followed by degassing in vacuum to remove the entrapped air bubbles in the sample. The temperature is adjusted to 20° C.±1° C. prior to the measurement where the emission of light scattered from particles of a sample is detected In one example the fibrillar cellulose is fibrillated parenchymal cellulose, which may have a Brookfield viscosity of at least 10 mPa·s, preferably at least 100 mPa·s, such as in the range of 10-800 mPa's, 10-500 mPa's or 10-200 mPa's, or in the range of 50-800 mPa·s, 100-800 mPa·s, 50-500 mPa·s, 100-500 mPa·s, or 50-200 mPa·s, measured at concentration of 1.05 (w/w) at 100 rpm shear rate at 20° C.±1° C. and/or a turbidity value less than 1000 NTU, preferably in the range of 100-700 NTU, measured at 0.1 (w/w) concentration. In an example the parenchymal cellulose has a yield stress in the range of 0.1-100 Pa at 0.5% aqueous dispersion at 20° C.±1° C. This kind of material has a relatively low fibrillation degree, which is suitable for the present use. Further, the manufacture of the material is simple and therefore the material is inexpensive, which is advantageous in the preset use requiring large amounts of the composition. The material is not too viscous which could be problematic when spraying the aqueous composition, and which could prevent the composition from penetrating the ground. Therefore such material is more preferred than for example highly fibrillated nanofibrillar cellulose, especially wood cellulose, which is very viscous and expensive material. The number average diameter of the parenchymal cellulose fibrils may be 200 nm or less, such as 2-200 nm, or 20-200 nm, for example 50-200 nm or 2-100 nm. The parenchymal cellulose may comprise cellulose from sugar beet, bagasse, cassava, and/or potato, or other suitable sources disclosed herein.

The fibrillar cellulose may be chemically modified, such as anionically or cationically modified. In one example the fibrillar cellulose is cationically modified, such as cationically modified parenchymal cellulose. In chemical modification the chemical structure of cellulose molecule is changed by chemical reaction ("derivatization" of cellulose), wherein the cellulose may be derivatized to comprise cationic substituents. The chemical modification of cellulose takes place at a certain conversion degree, which is dependent on the dosage of reactants and the reaction conditions. The substituent which provides cationic charge to the derivatized parenchymal cellulose may comprise an amine, such as a quaternary amine. Cationic derivative may be selected from alkyl substituted nitrogen compounds, aryl substituted nitrogen compounds, alkyl-aryl substituted nitrogen compounds, and alkyl substituted nitrogen halides. The derivatized parenchymal cellulose may have a degree of substitution which makes it highly dispersible in an aqueous medium, such as at least 0.05, preferably at least 0.1. In an example the degree of substitution is in the range of 0.05-0.5, such as in the range of 0.05-0.3.

In one embodiment the aqueous composition comprises fibrillar cellulose in the range of 0.05-2% (w/w). Such aqueous composition may be in a gel form. As the fibrillar cellulose can form a gel at relatively low concentrations, a concentration in the range of 0.01-2% (w/w) or 0.1-1% (w/w) may be used, preferably in the range of 0.1-0.5% (w/w). In the tests already 0.1-0.2% (w/w) was found adequate for most purposes. The concentration refers to the concentration in the final aqueous composition, which is to be applied at the site of use. More concentrated composition may be stored and transported and diluted prior to use, such as a stock solution comprising 4% (w/w) of fibrillar cellulose, for example 4-10% (w/w), which may be diluted for example 20-fold. A low concentration, in general 2% (w/w) or less, such as 0.5% (w/w) or less or 0.2% (w/w) or less, may be advantageous to enable efficient spraying of the material, which may be otherwise too viscous. However, on the other hand the viscosity properties of the fibril cellulose at said low concentration may help the spraying so that the formed spray remains stable and uniform and can be sprayed to a longer distance compared to a corresponding composition lacking fibrillar cellulose, which could spread uncontrollably. This helps applying the aqueous composition to the target at challenging conditions, such as at outdoor conditions, which may be windy.

The aqueous composition may also contain other ingredients, which may provide fire retardant properties, such as one or more of phosphoric acid, ammonium sulfate, ammonia, ammonium phosphate, urea, complexing agent, magnesium compound and/or combinations thereof. Preferably the aqueous composition does not contain boric compounds such as boric acid. In one example the aqueous composition further contains ammonium sulfate. In one example the aqueous composition further contains phosphoric acid and ammonium sulfate.

Phosphoric acid is effective fire and/or flame retardant agent. However, as phosphoric acid is harmful, it is desired to keep the content of the phosphoric acid in the composition as low as possible, if present. It may be desired to have a phosphoric acid content of 10% (w/w) or less, more particularly 7.5% (w/w) or less, or 5% (w/w) or less. The useful concentration of phosphoric acid for the preparation of the composition may vary, but generally 85% (w/w) stock solution may be used. Also 75% (w/w) solution is usable. The phosphoric acid may be present in an amount of about 2.5-10% (w/w), for example 2.5-7.5% (w/w) or 2.5-5% (w/w) in the final product. In one example the composition does not contain phosphoric acid.

Ammonium sulfate, more particularly diammonium sulfate, may be used as a fire retardant agent, especially to replace any phosphoric compounds, either completely or partially. It is a substance which is considered as safe and can be used even as a food additive. Therefore it is suitable for use in countryside or rural area.

The ammonium sulfate may be present in an amount of in the range of 2.5-25% (w/w), such as about 2.5-10% (w/w), for example 5.0-10% (w/w), 2.5-7.5% (w/w) or 5-7.5% (w/w). In general the ratio of ammonium sulfate to ammonium phosphate and/or phosphoric acid may be in the range of 1:2 to 99:1, for example in the range of about 3:1 to 10:1, for example about 2:1 to 1:2, or 2:1 to 1:1, such as about 1:1 (w/w). In one example the amount of ammonium sulfate is about the same as the amount of phosphoric compounds. This way the amount of phosphoric compounds can be kept at a low level. The ammonium sulfate also lowers the pH thus reducing the need for other pH adjusting agent(s). Generally the pH of the composition should be substantially neutral i.e. in the range of 6-8.

The aqueous composition may contain 2.5-10% (w/w) phosphoric acid and 2.5-10% (w/w) ammonium sulfate. In one example the aqueous composition contains 5-10% (w/w) phosphoric acid and 5-10% (w/w) ammonium sulfate. In one example the aqueous composition contains 2.5-7.5% (w/w) phosphoric acid and 2.5-7.5% (w/w) ammonium sulfate. In one example the aqueous composition contains 2.5-7.5% (w/w) phosphoric acid and 5-10% (w/w) ammonium sulfate. In one example the aqueous composition contains 2.5-5% (w/w) phosphoric acid and 5-10% (w/w) ammonium sulfate.

Urea has also fire retardant properties, but it may also be considered as an intumescent agent. Generally urea stock solution of about 46% is useful. Urea may be present in an amount in the range of 2-10% (w/w), such as in the range of 3-5% (w/w) of the final composition.

In one example the composition contains also a surfactant. The surfactant helps the composition to enter the target by lowering the surface tension between the liquid (the composition) and the solid, such as ground, earth, undergrowth, shrub layer, grass, moss or the like. This is advantageous especially when it is desired to treat ground or the like deeply, i.e. to enable penetration far below the surface of the ground, even to a depth of 50 cm or 100 cm or more, such as several meters, for example up to 2, 3, 4, 5, 6 7 or 8 meters. This is necessary for preventing or extinguishing for example ground, turf or peat fires, wherein the fire can burn slowly by smoldering below the surface.

Any suitable surfactant may be used, such as ionic or non-ionic. The surfactant may be added at any step during the manufacture of the composition. The surfactant may be selected for example from sulfonates, carboxyl acids, carboxylates, carboxymethyl cellulose, or catechins. Examples of surfactants include WP-3 by Faintend Ltd, Finland. The one or more surfactant(s) may be present in an amount in the range of 0.1-2.0 (w/w), such as 0.1-1.0%, more particularly 0.1-0.5% (w/w). In most cases an amount in the range of 0.1-0.2% (w/w) is adequate. However, it may not be desired to include surfactant, at least in high amounts, to compositions wherein efficient adhering properties are required, especially composition containing fibrillar cellulose.

Intumescent agents are also useful as flame retardants in normally flammable compositions. By definition, intumescence is a state of being tumid or inflated. An intumescent coating is one that will enlarge or expand to form a cellular structure when exposed to sufficient heat. Coatings of the intumescent type provide protection to heat and/or fire-vulnerable substrates by forming a flame retardant, thermally insulating barrier over the substrate. Other intumescent agents which may be used in the composition include guanidine, guanidine hydrochloride, glycine and further water-soluble amino acids and derivatives thereof such as amides.

In another example the composition further comprises a pH adjusting agent, for example any suitable inorganic acid or organic acid such as hydrochloric acid or citric acid, or any suitable base such as ammonia or NaOH. The pH adjusting agent may be added to neutralize the pH of the solution. The pH may be adjusted to a range of 6-8, such as to about 7.

The composition may comprise a complexing agent, such as one or more selected from EDTA, EGTA, nitrilotriacetic acid, diethylene pentaacetic add, dodecane tetraacetic add and salts thereof. In one specific example the complexing agent is ethylenediamine tetraacetic add (EDTA). The complexing agent may be present in an amount of about 0.3-2% (w/w), such as about 0.5-1.5% (w/w)

In another example the composition further comprises one or more colouring agent(s), such as water-soluble colouring agent(s). The colouring agent may comprise for example iron sulphate or a dye, such as organic dye, for example a dye used in food industry, such as an azo dye. Colouring agent(s) may be in included in an amount in the range of 0.01-0.1% (w/w), such as 0.05-0.1% (w/w). Examples of suitable dyes include Ponceau $4^R$ (trisodium (8Z)-7-oxo-8-[(4-sulfonatonaphthalen-1-yl)hydrazinylidene]naphthalene-1,3-disulfonate) and quinoline yellow (sodium 2-(1,3-dioxoindan-2-yl)quinolinedisulfonate).

If the aqueous composition contains a colouring agent, such as a dye, the treated areas can be easily distinguished from non-treated area. This is important especially when forming protective zones. If the application of the composition is paused, it can be reliably continued from the visible treated areas, which lowers the risk of leaving an area untreated. The colouring agent may be food grade colouring agent, which is not toxic and may be therefore used in the nature. Different colours may be provided and selected for example according to the target and/or season.

In one example the aqueous composition comprises monoammonium phosphate and microfibrillar cellulose, such as microfibrillar parenchymal cellulose. In one example the aqueous composition comprises monoammonium phosphate, magnesium sulphate and microfibrillar cellulose, such as microfibrillar parenchymal cellulose. In one example the aqueous composition comprises monoammonium phosphate, magnesium sulphate and surfactant. In one example the aqueous composition comprises monoammonium phosphate, magnesium sulphate, urea and EDTA. In one example the aqueous composition comprises magnesium sulphate and surfactant. In one example the aqueous composition comprises magnesium sulphate, urea and EDTA. pH of the composition may be adjusted by using acid or base, if required, such as with HCl or ammonia. The composition may be obtained by mixing the ingredients, for example into water, or if one or more ingredients are provided as aqueous solution, the other ingredients may be added to the aqueous solution, and further water may be added if required.

In one example the aqueous fire-retardant composition is obtained by a) mixing aqueous ammonia solution, ammonium sulfate and phosphoric acid, b) after about 30 minutes adding ammonium phosphate, such as monoammonium phosphate or diammonium phosphate, and c) after about 15 minutes adding urea and a complexing agent. In one example in step b) the pH is adjusted to about 7 with a pH adjusting agent. In another example in step c) a charring agent may be added.

Any suitable surfactant may be used. The surfactant may be added at any step, such as in step c). Fibrillar cellulose may be added last, or it may be added in any previous step a), b) or c).

In one example the aqueous composition contains 13-20% (NM) ammonium phosphate, 2.5-10% (w/w) phosphoric acid and 2.5-10% (w/w) ammonium sulfate. In another example the aqueous composition contains 13-20% (w/w) ammonium phosphate, 2.5-10% (w/w) phosphoric acid, 2.5-10% (w/w) ammonium sulfate, 15-20% (w/w) ammonia, 3-5% (w/w) urea, and 0.5-1.5% (w/w) complexing agent. In one example about half of the phosphoric acid is replaced with ammonium sulfate i.e. the ratio of phosphoric acid and ammonium sulfate is about 50:50.

The composition is present as an aqueous solution. In the formulas disclosed herein water may be added up to 100%. In one example ammonia water is used as a diluent when composing the composition. The described compositions may be used as such, or they can be further diluted, for example to 25-50% (w/w) dilution with water.

The composition may be provided as different versions for different uses, for example for forest fires, for ground fires, for peat or turf fires, for fire extinguishing uses and the like. The composition may be provided as a concentrate, for example to be diluted prior to use with water, for example by adding 1-3 parts of water to one part of the concentrate.

The present application provides a method for preventing wildfire in a target, the method comprising
    providing an aqueous composition disclosed herein,
    applying the aqueous composition to the target.

The target may include any target disclosed herein, such as outside and/or nature areas. Examples of suitable targets include countryside and rural areas, such as areas of terrain, ground, turf, peat, forest, brush, bush, desert, grass, hill, vegetation, veld and the like. Especially the target may include ground and vegetation in and/or on the ground, including turf and peat.

The target may be treated with any suitable method, such as by spraying, for example by using pressure to help the composition to penetrate ground, turf, peat or the like. The aqueous composition may be applied aerially or from the ground.

The aqueous composition may be prepared, and provided, preferably recovered and/or isolated, for example as a final product. After this it may be applied into a suitable container for storage, transportation and/or use. The container may be a transportable container, such as a portable container or a container installed or integrated into a vehicle. The container may be a sealed container, such as waterproof and/or gas proof container, in one embodiment the method comprises applying the aqueous composition to the target by spraying. In such case the method may comprise providing the aqueous composition in a container. The aqueous composition may be provided in a suitable container operatively connected to a source of pressure, such as in a pressurized container or in a container connected to a compressor, a pump, pressurized air or propellant, or other source of pressure. The aqueous composition may be sprayed through one or more nozzles. The spraying device arrangement may be portable, or it may be attached to a vehicle.

The aqueous composition may be applied by any other suitable method, such as by spraying or dropping from an aircraft.

In one embodiment the wildfire is selected from ground fires, turf fires, peat fires, crawling or surface fires, ladder fires and crown, canopy and aerial fires.

Even though living trees may be sprayed with the composition when treating the targets, methods for treating wood products, such as boards or planks, for example by impregnating, are completely different and therefore excluded from the present methods and uses.

The aqueous composition may be provided as a ready-made water-based solution, or the aqueous composition may be prepared or diluted from a concentrate prior to use. The aqueous composition may be provided in one or more container(s), and any suitable means for applying the solution may be provided, for example as included in a container or provided as separate equipment. A container may contain a source of pressure, such as propellant or pressurized air, so it may be pressurized, or it may be connected, or it may be connectable to a source of pressure, such as pressurized air, to enable spraying of the content of the container. The container may include means for spraying the composition, for example a spray nozzle. The container may also be in a form of a fire extinguisher. The container may be portable, for example carryable, such as in or as a backpack or the like, or it may be on wheels or the like, such as a towable container. A carryable container may have a volume for example in the range of 1-50 liters. The container may be integrated or installed in a vehicle, such as a ground vehicle or an aircraft.

One embodiment provides a container comprising the aqueous composition described herein, wherein the container may include instructions or other indication to use the aqueous composition for preventing wildfire. The instruction or indication may include for example a text and/or image(s) explaining the intended use, a trade name indicating the use, or a link to an external source of information providing the instructions.

The container may be any suitable container, such as a tank, a canister, a bottle, a bag, a tube or the like. The container may also be a vehicle tyre, or a bag or inner tube inside a vehicle tyre. This may be applied for example to vehicles used at outside and/or nature areas, such as countryside or rural area, for example areas of terrain, ground, turf, peat, forest, brush, bush, desert, grass, hill, vegetation, and veld. Examples of such vehicles include forest machine, (forestry) harvester, tractor, truck, car, earthmover, or any other suitable working machine. When using such vehicles, which usually are heavy and may include further working devices, there is a risk of uncontrolled heat, spark or the like, which may cause a fire especially at dry countryside or rural area. Therefore it is advantageous to have a reservoir of the aqueous composition integrated in the vehicle, so fire retardant or extinguishing composition can be sprayed immediately when needed. A tyre is a good location to store the aqueous composition, as it also includes pressure, which may be used for spraying the composition. Any suitable aqueous fire retardant or extinguishing composition may be stored in the tyre.

The present application provides a tyre or a wheel, such as a vehicle tyre or wheel, comprising an inner container, preferably an elastic inner container, such as a bag or an inner tube, arranged to receive aqueous fire retardant or fire extinguishing composition, i.e. liquid, the inner container being connected to a valve for releasing the aqueous composition. The "inner" refers to the inside of tyre or wheel, i.e. to a tyre cavity or air space. The inner container is closed, or it may be closed, for example by closing the valve, so it is impervious, or water/liquid proof and/or gas proof. The inner container may be collapsible. The inner container is liquid-inflatable, i.e. it is arranged to receive liquid or to be filled with liquid, such as water or other aqueous liquid, for example the aqueous fire retardant composition containing one or more fire retarding and/or extinguishing compound(s), such as any of the compositions disclosed herein. The tyre or wheel may be used in a fire retardant application or spraying device arrangement or system, or it may be a part thereof. The present fire retardant composition comprising fibrillar cellulose, which provides rheological properties helping maintaining the composition in a homogenous form and thus preventing precipitation of any of the ingredients, is especially suitable for storing the aqueous composition in the inner container in a vehicle tyre or wheel. Such stabile and homogenous composition does not cause unbalance to the wheel.

The present application also provides an inner container, such as described herein, arranged to be installed into a tyre or a wheel, and/or onto a rim. One embodiment provides an inner container in the form of a continuous ring-shaped elastic tube arranged to be installed into a tyre or a wheel, and/or onto a rim, the inner container being arranged to receive aqueous fire retardant or fire extinguishing composition, such as the aqueous composition described herein, and being connected to a valve for releasing the aqueous composition.

The tyre, the wheel, the rim and/or the inner container discussed herein may be for a vehicle, such as for an all-terrain vehicle, forest machine, (forestry) harvester, tractor, truck, car, earthmover, or any other suitable working machine. This means that the size, the material(s) and other properties may be adapted for such use and being compatible with such vehicles and/or wheels thereof.

The term "wheel" may refer to a rim comprising a tyre, more particularly a tubeless and/or compatible tyre installed onto the rim. Sometimes the word tyre may be also used to refer to the wheel. However, usually tyre (or tire) refers to the ring-shaped component that surrounds a wheel's rim to transfer a vehicle's load from the axle through the wheel to the ground and to provide traction on the surface traveled over. Examples of common materials of such pneumatic tires include synthetic rubber, natural rubber, fabric and wire, along with carbon black and other chemical compounds. Pneumatic tires are arranged to receive their air though a valve stem, which is a different valve from the valve which is used for outputting the aqueous fire retardant composition from the inner container. In one embodiment the valve is a separate valve from the air input valve of a tyre or a wheel. The valve is installed or is arranged to be installed to a rim, for example to a hole or an aperture in the rim.

The inner container is not an inner tube of a tyre, which inner tubes are provided for filling the whole interior of the tyre and preventing air leakage. The inner container, even when filled with the liquid, does not fill the whole interior of the tyre or wheel. The inner container is arranged to fit into the tyre or wheel in such way that an air space is left or maintained and/or that the inner container fills only a part of the tyre cavity, for example the inner container may use at the most 80% of the space inside the tyre or wheel, such as at the most 60%, at the most 50%, at the most 40%, at the most 30% or at the most 20% of the air space or cavity of the tyre or wheel. The inner container therefore divides the space inside the tyre or wheel into two or more compartments or chambers, one being arranged to receive gas, such as air, and one being arranged to receive liquid, such as the aqueous fire retardant composition. In such way the wheel can retain its original properties, such as adequate air pressure, which is also required to operate the fire retardant application or spraying device.

The material(s) of the inner container is selected in such way that it is compatible with the aqueous fire retardant composition, especially the compound(s) included in the composition and other properties, such as rheological properties, of the composition. The material(s) may be selected in such way that the compounds of the composition do not deteriorate the structure of the inner container, such as the wall of the inner container. The materials and the wall thickness of the inner container are selected in such way that they tolerate the gas and air pressures and pressure changes in the tyre or wheel during storage and use. The wall thickness may be for example in the range of 1-3 mm, such as 1-2 mm. The inner container may be manufactured from rubber, silicone and/or elastic plastics, or other suitable elastic materials or combinations thereof, including composite materials. Such materials may be especially used with the fire retardant compounds disclosed herein.

The wheel or tyre may comprise one or more inner container(s), which may be in the form of a continuous ring-shaped elastic tube. Elastic material is capable of stretching, more particularly capable of stretching so as to return to an original shape or size when force is released. The tube may be formed of elastic material or it may comprise elastic material, such as rubber, silicone, plastic or a combination thereof, for example a composite material, it may contain a reinforcing part. A continuous ring-shaped elastic tube may be arranged to fit onto a rim, especially in such way that a tyre, such as any compatible and/or suitable tyre, can be installed onto the rim enclosing also the continuous ring-shaped elastic tube inside in such way that a gaseous pressure, when applied into the tyre, will effect the elastic tube and cause enough pressure inside the tube. The inner container is pressurizable by the gas pressure in the tyre or wheel. So when released though a valve or the like, the liquid content of the elastic tube will be outputted by the pressure, preferably with such force that provides a suitable spraying of the liquid. Any other suitable inner container may be installed and therefore may also function in analogous way. The gaseous pressure is usually air, as a tyre, when installed onto a rim and filled with air, provides a suitable source of air pressure.

The vehicle tyre may be designed for a vehicle for forest or ground work or the like work, such as a tractor, for example a forest tractor, or an all-terrain vehicle or other suitable vehicle. The tyres or wheels of such vehicles are relatively large so that it is possible to store even hundreds of liter of the aqueous composition in the tyre while still including enough gaseous pressure in the tyre. The bag or inner tube may be arranged to receive 100 liters or more of the liquid, such as 200 liters or more, 300 liters or more, 500 liters or more, up to 1000 liters, such as 100-1000 liters, 100-500 liters or even 500-1000 liters. Tyres or wheels of such vehicles are especially suitable for the present construction as the speed of the vehicle is usually not so high that the inner container installed inside a tyre or wheel would cause problems, such as unbalance, for the steering or other operation of the vehicle when the tire or wheel is rotating.

In one example the tyre contains a bag or an inner tube, which is made of flexible and/or elastic material, for the aqueous composition connected to a valve in the wheel of the tyre. The pressure inside the tyre may be used to release the composition inside the bag or inner tyre. The bag or inner tube may be connected to the valve with a tube, such as a flexible and/or elastic tube, for example tube comprising plastic, rubber or the like. The valve may be a separate valve from the air valve of the tyre. The valve may contain means for releasing the aqueous composition, which is at a pressurized state inside the tyre. A further tube may be connected to this valve for applying and/or spraying the aqueous composition to target. If the composition is inside the tyre without any inner bag or tube, the composition may be released in similar way through the air valve of the tyre.

The present disclosure provides a vehicle comprising the tyre in a vehicle, more particularly in a wheel of the vehicle. The wheel refers to any wheel under the vehicle, i.e. a wheel installed on the vehicle, such as a drive wheel and/or a trailer wheel, which wheels usually are arranged to be in contact with the ground, road or other support on which the vehicle is operated. Any spare wheels not in use may be excluded. It is advantageous to have such a reservoir of aqueous fire retardant composition in a tyre or wheel, which is already available outside the vehicle. For example a vehicle used outdoors, such as at terrain, forest or any other target disclosed herein, may itself cause a risk of fire, or it may operate at a site of fire. Such vehicles include vehicles used for forest or ground work or the like work, such as a tractor, for example a forest tractor, or an all-terrain vehicle or other suitable vehicle, which has wheels and tyres, more particularly which operates on wheels and tyres.

Such a vehicle may periodically require use of chains on the wheels, for example at challenging conditions, which chains may cause sparks, for example when hitting a rock or metal, and therefore cause a wildfire. Also other parts of the vehicle, rocks, flammable chemicals and/or other objects and/or substances may cause fire or a risk of fire. Therefore it would be advantageous to have a reservoir of fire retardant immediately available from a tyre installed in the vehicle. As soon as a fire is detected, a compatible hose may be plugged into a valve or the like output means in the wheel or the tyre, and fire retardant or other aqueous liquid may be sprayed to the target, preferably though a nozzle in the hose. The container is always available at open location so there is no need to start opening hatches, doors, boots or the like and to find a fire retardant container and probably also move the container to a more convenient location. A compatible hose, or the like outputting means, connectable to the valve, optionally equipped with a nozzle or other directing and/or outputting device, may be provided, for example stored in the vehicle.

The wheel may include one or more valve(s), such as valve(s) in the rim, wherein an outputting part or means is available from the wheel for connecting to a compatible hose, tube or the like. An existing rim or similar part may be modified to include such additional valve(s). For example one or more hole(s) may be drilled to a rim, the hole(s) being arranged to receive a valve. The valve(s) may be operable connected via a tube to the bag or inner tube inside the tyre, for example an inner tube installed on the rim, so that the bag or tube may be filled with aqueous liquid, preferably fire retardant, via the valve, and during use the liquid may be outputted via the same and/or different valve(s) to provide the liquid to the desired target. The valve may include or be connected or be connectable to a nozzle, a hose, a tube and/or the like outputting means for spraying or otherwise outputting the liquid. The valve or the connected part may include means for opening and/or closing the valve and/or the flow of the liquid, such as manual means or remotely controlled means.

The valve(s) and/or the outputting means may be arranged to spray or otherwise output the liquid to a desired spot or location near or around the vehicle, for example beside the tyre or the wheel. By using such an arrangement, it is possible to form a protective zone or the like area, especially when driving the vehicle. Such treated areas may be formed around a fire, around an area of risk of fire, or at the sides of roads, such as onto shoulders. In such case the driver of the vehicle may immediately, when needed, form a protective zone around a detected fire or onto a desired area or location. This saves substantial amount of time and the fire can be isolated and preferably extinguished already at the start so that the damages will be minimal. It is possible to provide the system as remotely controllable, for example wirelessly, so that the outputting means, such as valve or other means connected to the valve, may be remotely opened and/or closed, for example from the cockpit or driver's cab of the vehicle, to output liquid from the inner container. Such a valve may be positioned to provide the spray to a desired location beside the tyre, wheel or the vehicle.

The aqueous composition may be sprayed or otherwise applied to a target to form a protective zone or other area, for example at least partly around an existing fire. The protective area may be elongated having a width in the range of 1 meter to 500 meters. The required width of the protective area depends on the environment, for example if there is no or very little vegetation, a protective area of few meters may be enough, for example 1-10 meters. On the other hand, if there are tall trees, a protective area having a width of at least twice the height of the trees may be required, such as in the range of 20-60 meters, or more, such as 20-100 meters. Further if there is a risk of spreading of fire by burning tree parts carried by wind, even wider protective zone may be required, such as 50-200 meters, or even 100-500 meters.

It is possible to detect an underground fire by using thermal camera or the like heat-sensitive detecting means. A fire smoldering deep in the ground, such as turf or peat, even in the depth of several meters, can be detected and the area may be treated with the aqueous composition. One specific example of such fire is a hidden fire caused by military exercise or operation, wherein a grenade or a tracer hits the ground and may cause a fire that is deep in the ground and may be invisible for several hours, such as 2-72 hours. In one example a drone, such as a remotely controlled drone or automated drone, equipped with the heat-sensitive detecting means is used to detect fire, which may be visible or hidden. In general an exceptionally high temperature, which triggers desired action(s), is detected. The drone may be equipped with a container containing the aqueous composition, and means for applying the aqueous composition to target, such as remotely controllable means for spraying the composition to the target. When fire is detected with the heat-sensitive detecting means, which may be seen in a remotely received video image, the drone may be driven to the target and the aqueous composition may be remotely released to the area requiring treatment. Depending on the size of the drone, it may be possible to carry substantial amounts of the composition with the drone, for example 1-300 liters. Even a relatively small amount of the present composition may be enough for treating the target and even distinguishing fire, so the composition suits especially well for such drone use. The drone may be partly or fully automatized, and when needed it may autonomously fill its reservoir(s) with the aqueous composition, reload its batteries, and carry out flight routines for example at determined time intervals, such as every 30 or 60 minutes. The drone may automatically trigger a fire alarm and/or start treating the target with the composition, when it detects a fire.

EXAMPLES

Following composition were prepared and tested as fire retardants with samples obtained Thorn nature, such as blocks of turf, peat or ground with vegetation, and also at areas of nature. The composition showed good fire retardant properties. Different compositions may be used for different targets.

Example 1

An aqueous composition comprising monoammonium phosphate is prepared by adding to water monoammonium phosphate (BonsoGuard) and mixing. The content of monoammonium phosphate is 50% (w/w).

Example 2

An aqueous composition is prepared comprising 50% (w/w) monoammonium phosphate (BonsoGuard), and 0.2% (w/w) microfibrillar parenchymal cellulose from beet pulp (Betulium MFC by Betulium Oy). The ingredients are mixed to obtain a composition which is ready to be used.

Example 3

An aqueous composition is prepared comprising 25% (w/w) monoammonium phosphate (BonsoGuard), 50% (w/w) magnesium sulphate (Carl Roth GmbH) and 0.2% (w/w) microfibrillar parenchymal cellulose from beet pulp (Betulium MFC by Betulium Oy). The ingredients are mixed to obtain a composition which is ready to be used.

Example 4

An aqueous composition is prepared comprising 25% (w/w) monoammonium phosphate (BonsoGuard 69), 50% (w/w) magnesium sulphate (Carl Roth GmbH) and 0.2% (w/w) Greenfain WP3 surfactant (Faintend). The ingredients are mixed to obtain a composition which is ready to be used.

Example 5

An aqueous composition is prepared comprising 50% (w/w) magnesium sulphate (Carl Roth GmbH) and 0.2% (w/w) Greenfain WP3 surfactant (Faintend). The ingredients are mixed to obtain a composition which is ready to be used.

Example 6

An aqueous composition is prepared comprising 50% (w/w) magnesium sulphate (Carl Roth GmbH) and 0.2% (w/w) microfibrillar parenchymal cellulose from beet pulp (Betulium MFC by Betulium Oy). The ingredients are mixed to obtain a composition which is ready to be used.

Example 7

One liter of aqueous composition is prepared by combining 600 g water, 242 g monoammonium phosphate, 153 g magnesium sulphate, 75 g aqueous urea (40%), 20 g HCl and 10 g aqueous EDTA.

The composition stayed homogenous for over one year. When applied to wood chips, the chips did not cake but remained separate.

Example 8

The compositions disclosed herein were used in fire tests disclosed in FIGS. 1-10. Tested compositions contained monoammonium phosphate (BonsoGuard 69), magnesium sulfate, and some also contained microfibrillated parenchymal cellulose (Betulium MFC).

Figure 1:
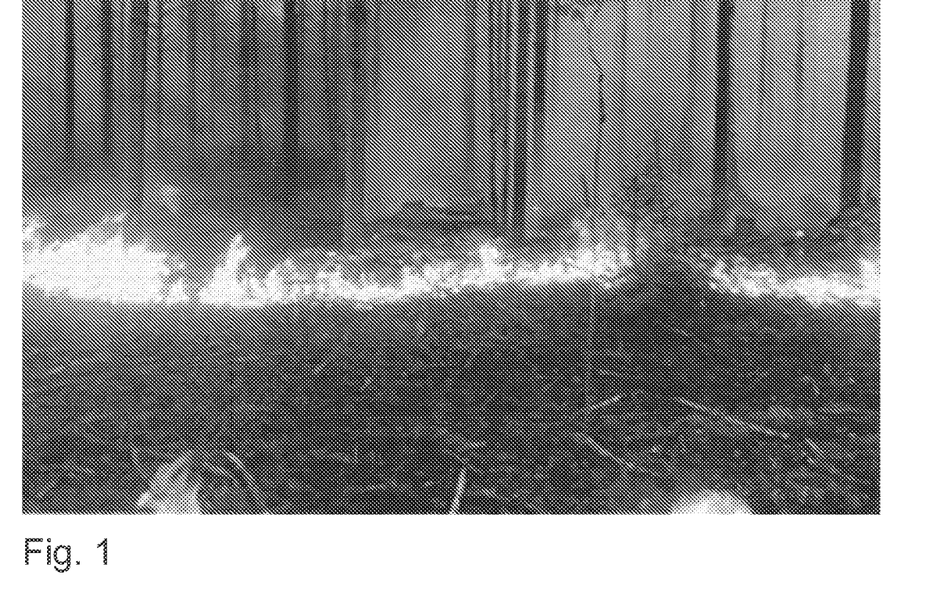
FIG. 1 shows test ire at terrain
Figure 2:
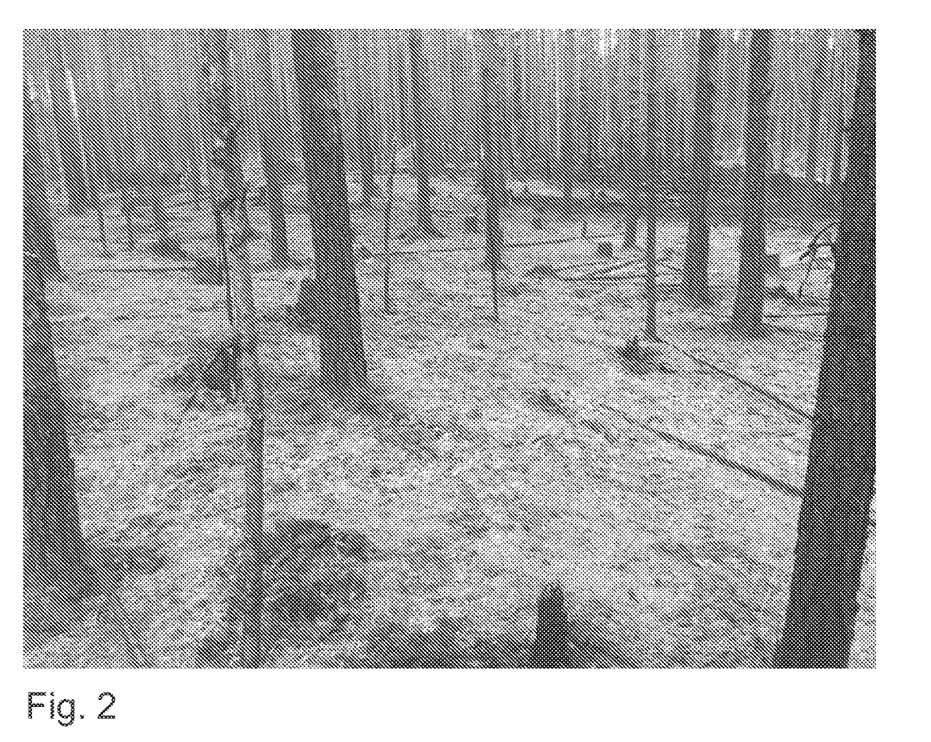
FIG. 2 shows the terrain afterwards
Figure 3:
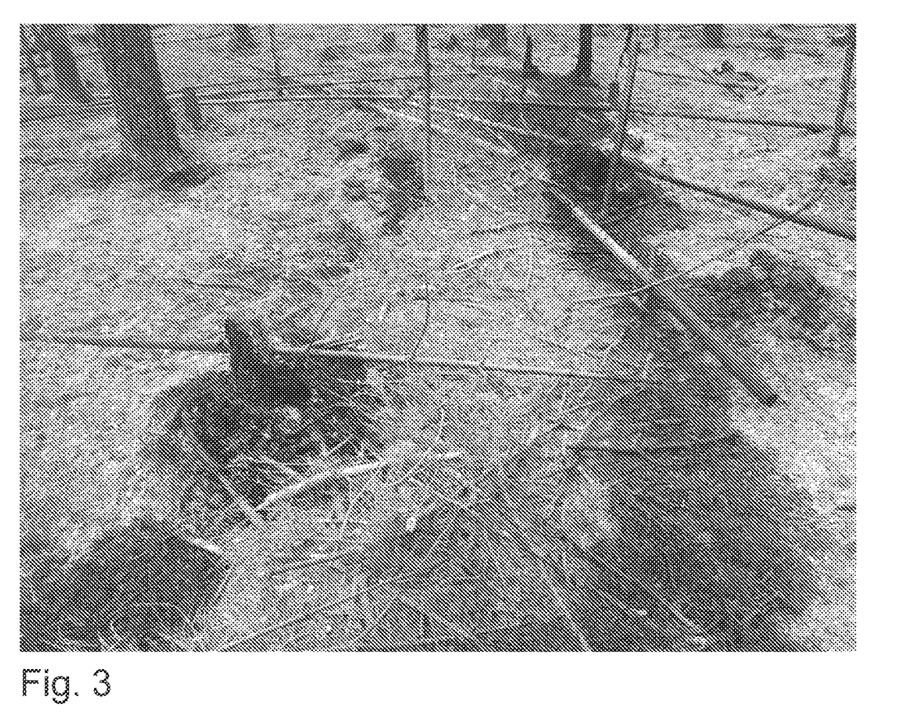
FIG. 3 shows the terrain afterwards at an area treated with the aqueous composition

FIGS. 1-3 show fire tests at terrain, FIG. 2 shows the result after water treatment, and FIG. 3 shows the result after treatment with the aqueous composition comprising diammonium phosphate, ammonium sulphate, phosphoric acid, urea and EDTA, wherein a protected zone can be seen in the middle of the image in a vertical direction. The untreated burnt areas are grey but the treated area is not burnt and therefore it has maintained the original colours of the plant material (not visible in the greyscale image).

Figure 4:
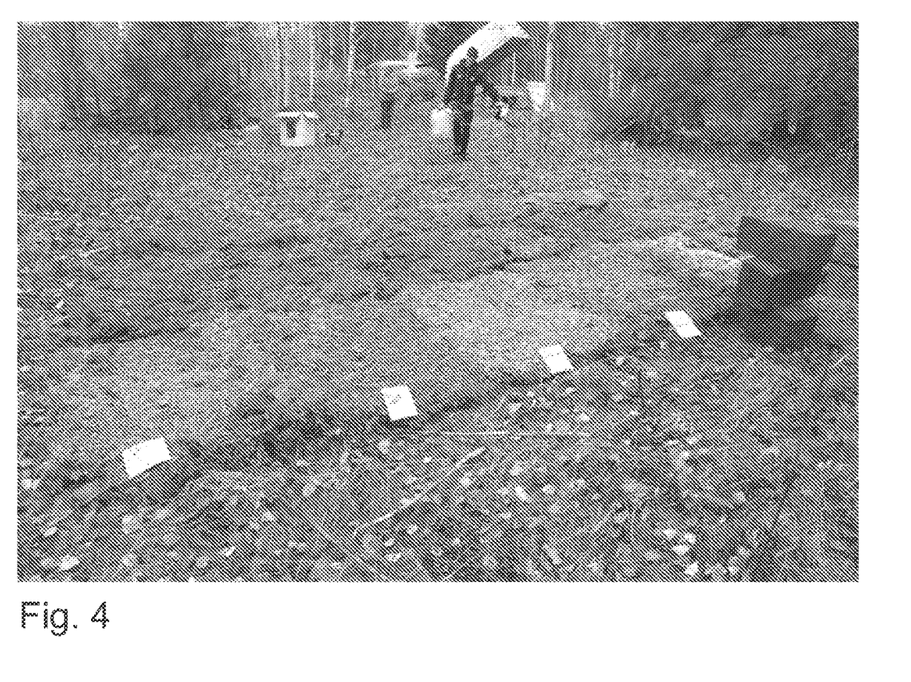
FIG. 4 shows a setup of test blocks before fire

In FIG. 4 a series of turf test blocks are arranged in line on the ground. The test blocks at the front from left to right are treated with 1) monoammonium phosphate ("69"), 2) magnesium sulfate ("1308"), 3) magnesium sulfate ("1308") and fibrillar cellulose ("MFG"), each treated with 3 liters of aqueous composition per square meter. The corresponding tests blocks at the back line are not treated.

Figure 5:
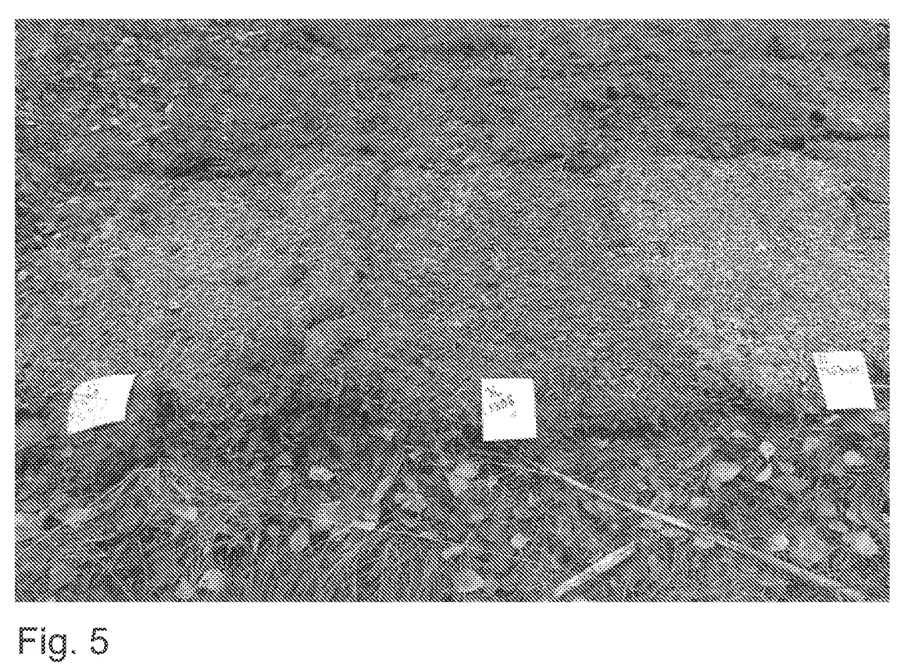
FIG. 5 shows a setup of test blocks before fire

FIG. 5 shows another view of the same test blocks. It can be seen from the figures that the advancing of fire was stopped at the edges of the treated blocks even though the intensity of the fire was very high at the beginning. Some of the treated blocks were blackened at their surface but the fire did not penetrate the blocks or continue even though the blocks were in contact with the fire for a long time.

Figure 6:
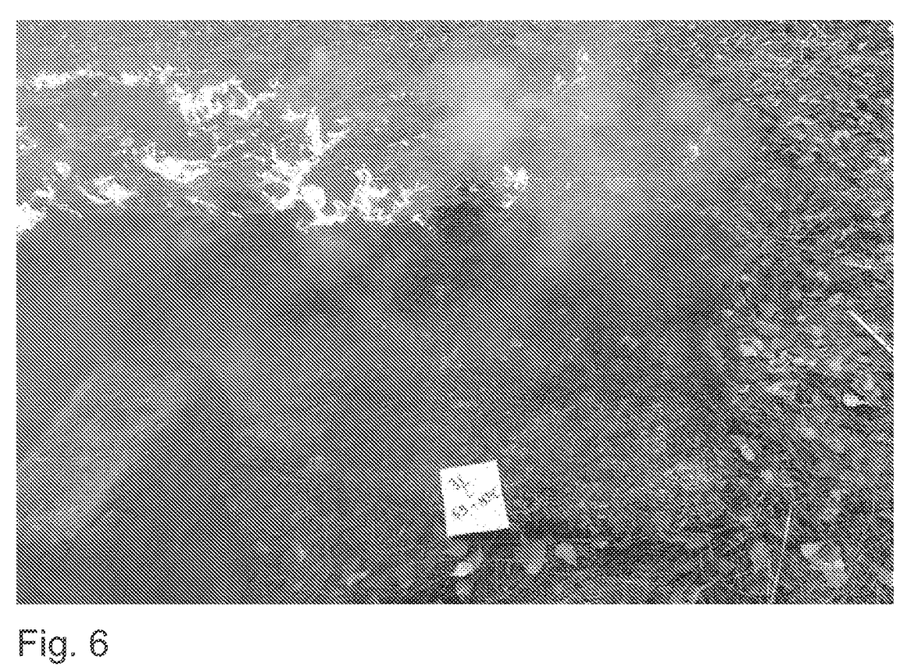
FIG. 6 shows a test fire in the blocks
Figure 7:
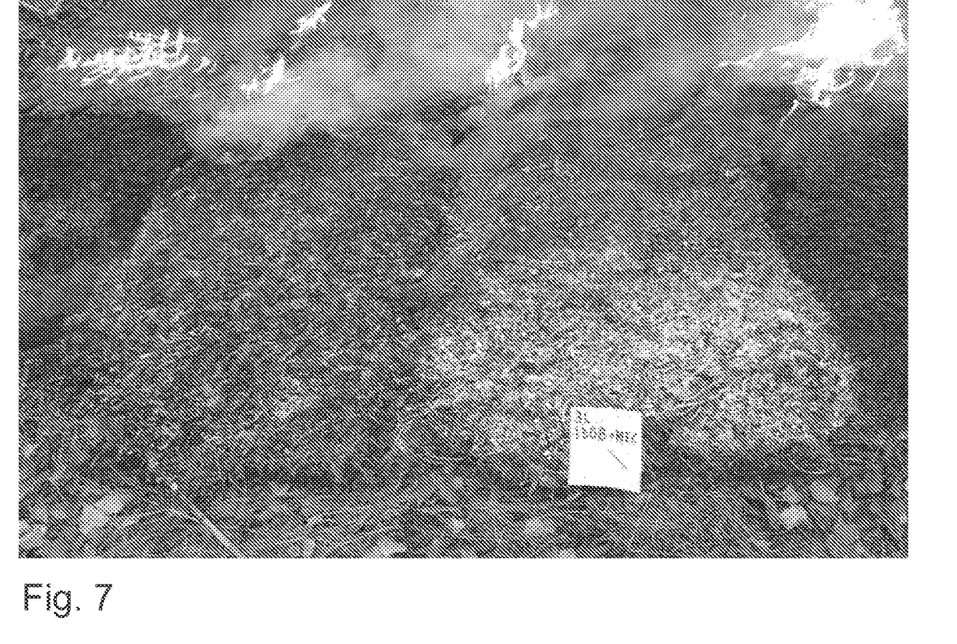
FIG. 7 shows test blocks after fire test
Figure 8:
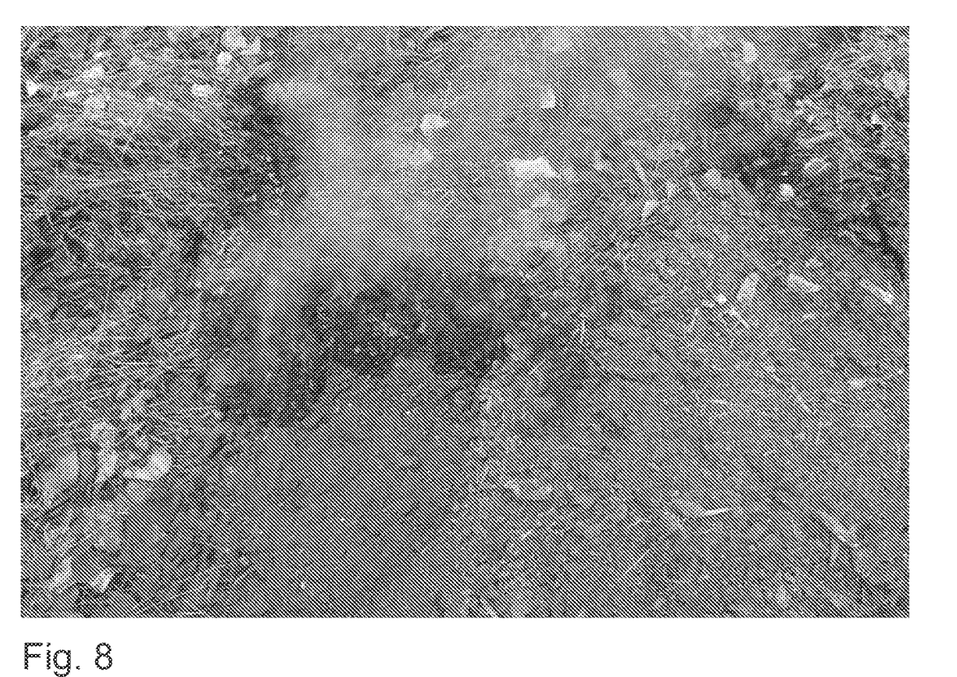
FIG. 8 shows crushed turf after fire test

FIGS. 6 and 7 show the advance of fire in the untreated blocks (background) and how the treated blocks are not ignited. It was also seen that compositions comprising fibrillar cellulose was bound also to the surfaces of the blocks.

Crushed turf was treated with the aqueous composition. From FIG. 8 it can be seen that the fire did not proceed in the treated crushed turf.

Figure 9:
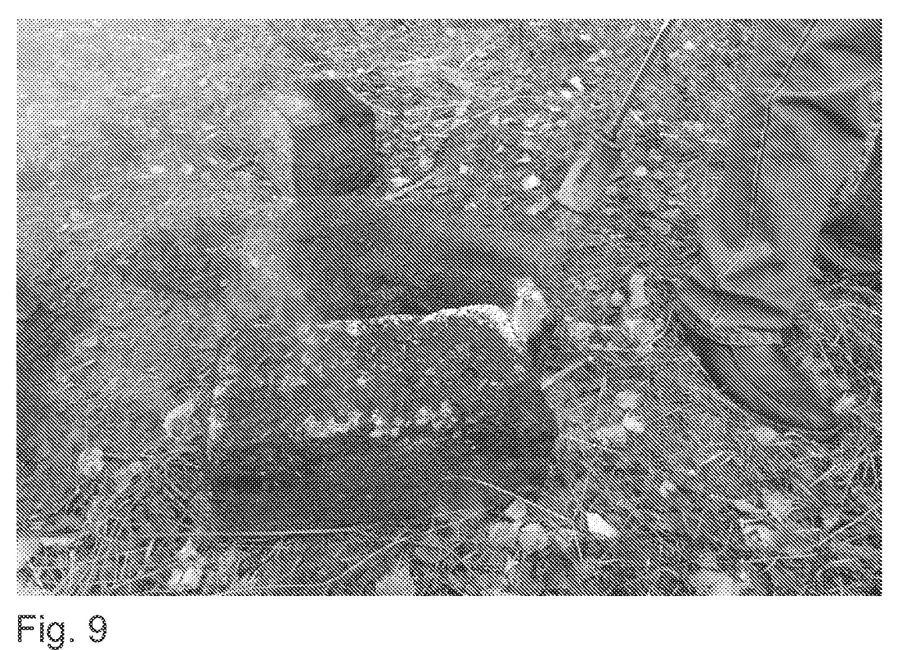
FIG. 9 shows a turf bale after fire test
Figure 10:
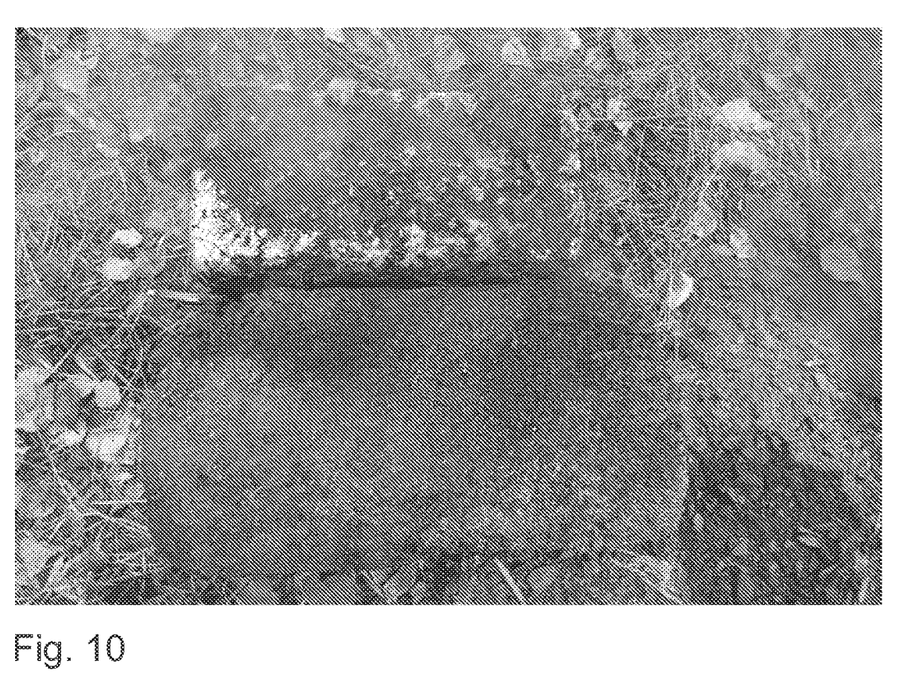
FIG. 10 shows a turf bale after fire test

Turf bales were treated with an aqueous composition comprising 25% monoammonium phosphate and ignited. As can be seen in FIGS. 9 and 10, the treated turf bale was blackened at the surface only, but the fire did not enter the bale. Even when a gas burner was used the treated bale only charred and glowed as red, but immediately when the gas burner was withdrawn the glowing stopped. In untreated bales the fire penetrated inside the bales and the surface become charred and turned into grey.

Example 9

Figure 11:
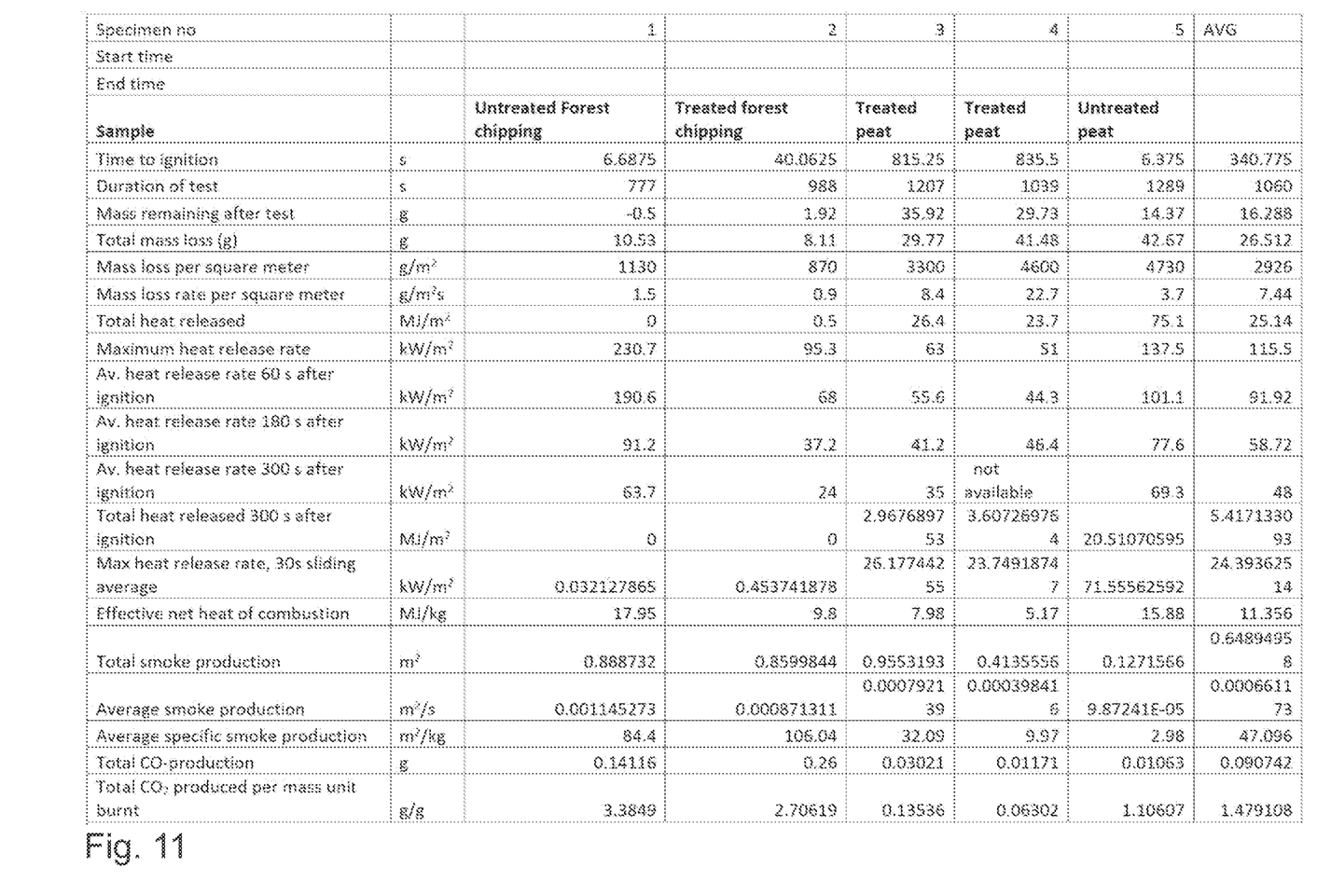
FIG. 11 shows a table presenting results from ignition tests
Figure 12:
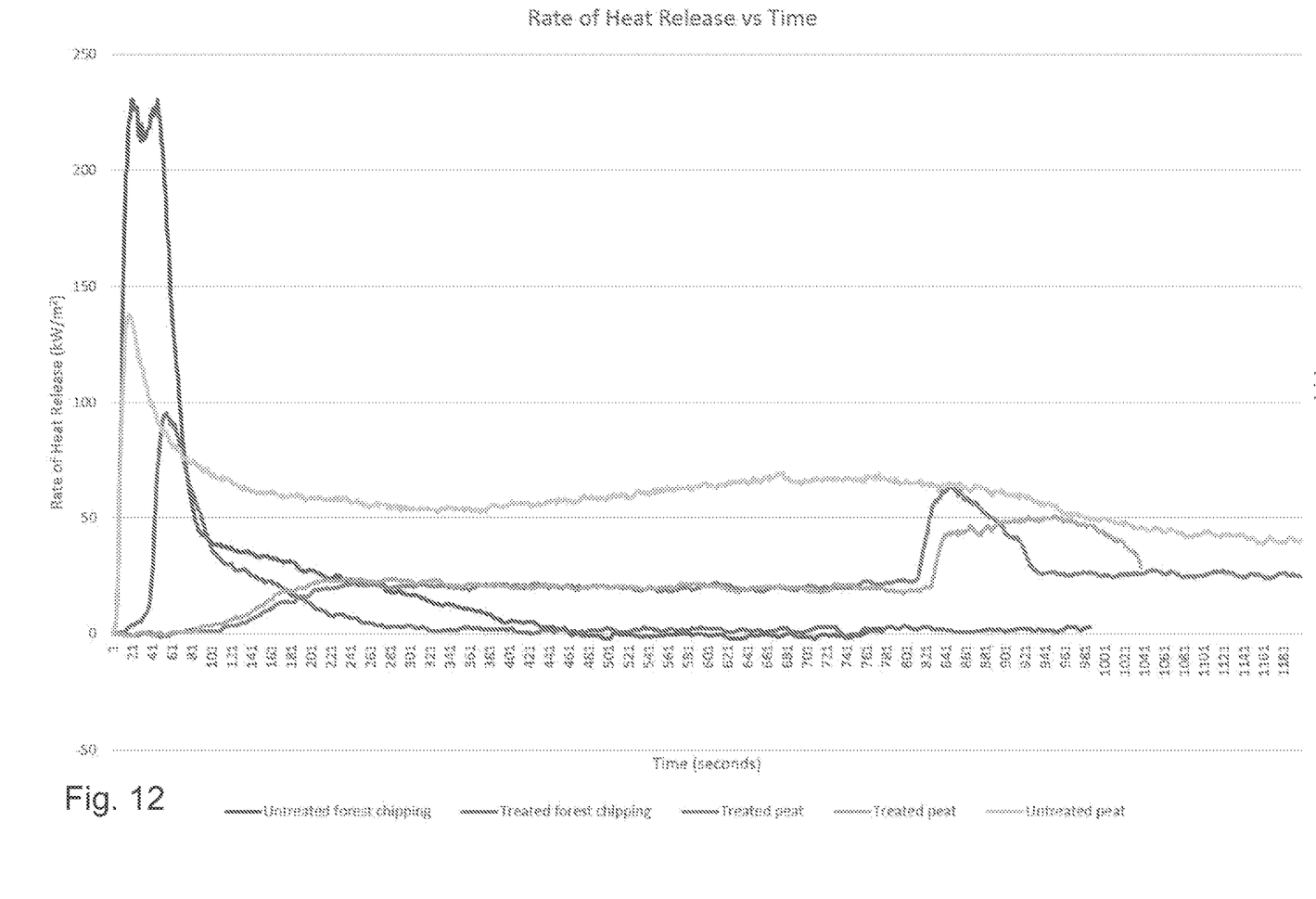
FIG. 12 shows a graph presenting measured heat release rates

Different samples were treated with composition comprising 50% (w/w) monoammonium phosphate (Bonso-Guard) and 2% (w/w) microfibrillar parenchymal cellulose from beet pulp (Betulium MFC by Betulium Oy). The samples were tested and analyzed for ignition and burning. The results are shown in Table 1 in FIG. 11. FIG. 12 shows rate of heat release versus time. Untreated forest chipping (the highest peak at the beginning) and untreated peat (the second highest peak at the beginning) provided highest initial heat releases and the heat release remained also high over a prolonged time. On the other hand, especially the treated peat did not release heat at all in the beginning and even over longer time the heat release was low.

The invention claimed is:

1. A method for preventing wildfire at a target by enhancing adhesion of a fire retardant to the target, the method comprising:
   providing sprayable aqueous composition; and
   applying the aqueous composition to the target by spraying;
   wherein the aqueous composition comprises:
      a fire retardant; and
      a dispersion of fibrillar cellulose obtained through a fibrillation process of plant cellulose fibers, wherein the fibrillar cellulose has an average diameter of fibrils or fibril bundles of 2 μm or less, wherein the fibrillar cellulose has an average length of fibrils or fibril bundles of from 1 to 100 micrometers;
   wherein the aqueous composition comprises the fibrillar cellulose in a range of 0.1-2% (w/w);
   wherein the aqueous composition either:
      does not include a surfactant; or
      further comprises a surfactant in an amount of 0.1-0.5% (w/w);
   wherein the target is an outside nature area; and
   wherein the aqueous composition enhances adhesion of the fire retardant to the target.

2. The method of claim 1, wherein the fibrillar cellulose comprises fibrillar parenchymal cellulose.

3. The method of claim 1, wherein the dispersion of fibrillar cellulose has a Brookfield viscosity of at least 10 mPa·s, measured at concentration of 1.05 (w/w) at 100 rpm shear rate at 20° C.+1° C.

4. The method of claim 1, wherein the fibrillar cellulose has an average diameter of fibrils or fibril bundles of 100-1000 nm.

5. The method of claim 1, wherein the fire retardant comprises an ammonium phosphate.

6. The method of claim 1, wherein the fire retardant comprises a magnesium compound.

7. The method of claim 1, wherein the aqueous composition further comprises the surfactant in an amount in a range of 0.1-0.5% (w/w).

8. The method of claim 1, wherein the wildfire is selected from ground fires, turf fires, peat fires, crawling or surface fires, ladder fires and crown, canopy and aerial fires.

9. The method of claim 5, wherein the ammonium phosphate comprises diammonium phosphate, monoammonium phosphate, or a combination thereof.

10. The method of claim 5, wherein the fire retardant comprises 5-55% (w/w) of the ammonium phosphate, based on the total weight of the aqueous composition.

11. The method of claim 6, wherein the magnesium compound comprises magnesium sulphate.

12. The method of claim 6, wherein the fire retardant comprises 15-50% (w/w) of the magnesium compound, based on the total weight of the aqueous composition.

13. The method of claim 7, wherein the surfactant comprises an ionic or non-ionic surfactant.

14. The method of claim 7, wherein the surfactant is selected from the group consisting of sulfonates, carboxyl acids, carboxylates, carboxymethyl cellulose, and catechins.

15. The method of claim 1, wherein the target is countryside or rural area.

16. The method of claim 1, wherein the target is an area of terrain, ground, turf, peat, forest, brush, bush, desert, grass, hill, vegetation, veld, or a combination thereof.

17. The method of claim 1, wherein applying the aqueous composition to the target comprises applying the aqueous composition to ground to impregnate the ground.

18. The method of claim 1, wherein the aqueous composition does not include a surfactant.

19. The method of claim 1, the method of claim 1, wherein:
   the aqueous composition consists of the fire retardant and the dispersion of fibrillar cellulose, or p1 the aqueous composition consists of the fire retardant, the dispersion of fibrillar cellulose, and the surfactant in an amount of 0.1-0.5% (w/w).

* * * * *